United States Patent

[11] 3,610,908

| [72] | Inventor | Raymond Karosas<br>Quincy, Mass. |
|---|---|---|
| [21] | Appl. No. | 9,901 |
| [22] | Filed | Feb. 9, 1970 |
| [45] | Patented | Oct. 5, 1971 |
| [73] | Assignee | Cutler-Hammer, Inc.<br>Milwaukee, Wis. |

[54] ELECTRONIC INTEGRATOR SYSTEM
14 Claims, 11 Drawing Figs.

[52] U.S. Cl............................................. 235/183,
177/16, 235/150.51, 328/127
[51] Int. Cl......................................... G06g 7/18,
G01g 11/14
[50] Field of Search............................235/150.51,
151.33, 151.34, 183; 73/206, 227, 503; 177/16;
324/162; 328/127

[56] References Cited
UNITED STATES PATENTS

| 3,256,426 | 6/1966 | Roth et al. | 235/183 |
| 3,530,458 | 9/1970 | Willard et al. | 235/150.51 X |
| 3,539,027 | 11/1970 | Fathauer | 177/16 |
| 3,550,018 | 12/1970 | James et al. | 235/150.51 X |

*Primary Examiner*—Malcolm A. Morrison
*Assistant Examiner*—Jerry Smith
*Attorney*—Hugh R. Rather

ABSTRACT: A solid-state integrator that receives tow information signals, namely, a weight signal and a speed signal, integrates these signals and provides an output signal proportional to the product thereof that is indicative of total weight of material that has passed a scale. The weight signal comes from the scale and is a negative DC voltage having an amplitude proportional to the weight per unit length of conveyor belt. The speed signal comes from a belt rider measuring wheel operated pulse generator and consists of 100 uniform width pulses per foot of belt travel. An amplifier at the integrator input amplifies the weight signal and has an input bias adjusting potentiometer for zero calibration and an attenuation adjusting potentiometer at its output for span calibration. Span refers to the correct total weight of a run of several belt circuits with a test weight. Zero refers to zero total weight of a run of several belt circuits empty. For integration purposes, the speed pulses are shaped, get in step with the clock, and are stretched to desired width by a clock controlled preset pulse width generator. This pulse, called "fill" pulse, whose width is precisely controlled by the clock, operates an analog gate via a gate driver, allowing DC voltage representing weight on a scale to enter the integrator and charge the integrating capacitor therein. The integrator is bidirectional and will accumulate both positive and negative charges and will provide a DC voltage having a polarity and amplitude proportional to the algebraic sum thereof. The integrator receives two control signals, namely, a fill pulse described previously and "dipout" pulses, the latter being essential in an integration process -- without them the integrator would saturate. Dipout pulses can be in step with the clock pulse, or in step with the inverted clock pulse, depending on demand. The dipout pulses operate the other analog gate via a gate driver which allows the positive or negative half-cycles of the sine wave voltage to discharge the integrator capacitor. Dipout is started by a voltage level detector so that the integrator does not exceed its capacity in continuous running. The uniform dipout quantities are counted in a forward-backward operable weight totalizer to provide a running indication of the total weight of material that has passed over the scale and for other control and indication purposes. This method of integration -- where the sine wave drives the transducer, generates clock and inverted clock pulses, controls the pulse width of the fill pulse and the pulse width of the dipout pulse, and the same sine wave is used for dipping out the integrator -- all this provides "bridging action," that is, automatic self-compensation in response to frequency or amplitude variation in the sine wave voltage so that no error will be introduced in the output.

ELECTRONIC INTEGRATOR SYSTEM

BACKGROUND OF THE INVENTION

Integrators have been known heretofore. Some systems have used entirely mechanical means for the integration of material flow signals. The known ball and disk or cone and disk multipliers in conjunction with mechanical lever-type scales represent the early versions of integrators. Later types incorporated servomechanisms and repeaters for the transmission of weight and speed signals to remotely located mechanical integrating apparatus. More recently, the strain gauge load cell and the tachometer generator speed sensor have emerged as a convenient combination where control and recording functions are required.

An all solid-state integrator system is generally considered to offer the greatest probabilities in terms of reliable and maintenance-free operation. While early approaches in this direction have proven reasonable successful in short term measurement capability, they have generally lacked the stability to be considered accurate and reliable over extended periods of time. The question of accurate and reliable operation has become particularly important in view of uninterrupted operation demanded by many of the modern processes. The present invention relates to improvements over prior integrator systems.

SUMMARY OF THE INVENTION

This invention relates to an electronic integrator system that includes dipout to afford continuous running, automatic self-compensation with respect to control signal variation, noninteracting zero and span adjusting means and means to inhibit the system output a time interval after each fill pulse to prevent error when fill pulses occur infrequently, such as at low speed and a time interval after conveyor turnoff, and has an improved construction that provides accurate and reliable operation.

An object of the invention is to provide an improved integrator system.

A more specific object of the invention is to provide an improved integrator system that prevents introduction of error into its output due to frequency or amplitude variation in the sine wave control signal.

Another specific object of the invention is to provide an improved integrator system that prevents introduction of error into its output during conditions of no input or infrequent input thereto.

Another specific object of the invention is to provide an integrator system of the aforementioned type that incorporates zero and span adjusting means of the noninteracting type.

Another specific object of the invention is to provide an improved integrator system capable of integrating positive and negative information indicative input signals and uses both positive and negative half-cycles of a sine wave for dipout of the integrated voltage to afford continuous operation.

Another specific object of the invention is to provide an integrator system that uses half-cycles of a sine wave for dipout and incorporates self-compensation to prevent introduction of error due to frequency or amplitude variation in such sine wave.

Other objects and advantages of the invention will hereinafter appear.

DESCRIPTION OF THE PREFERRED EMBODIMENT

Figure 1A:
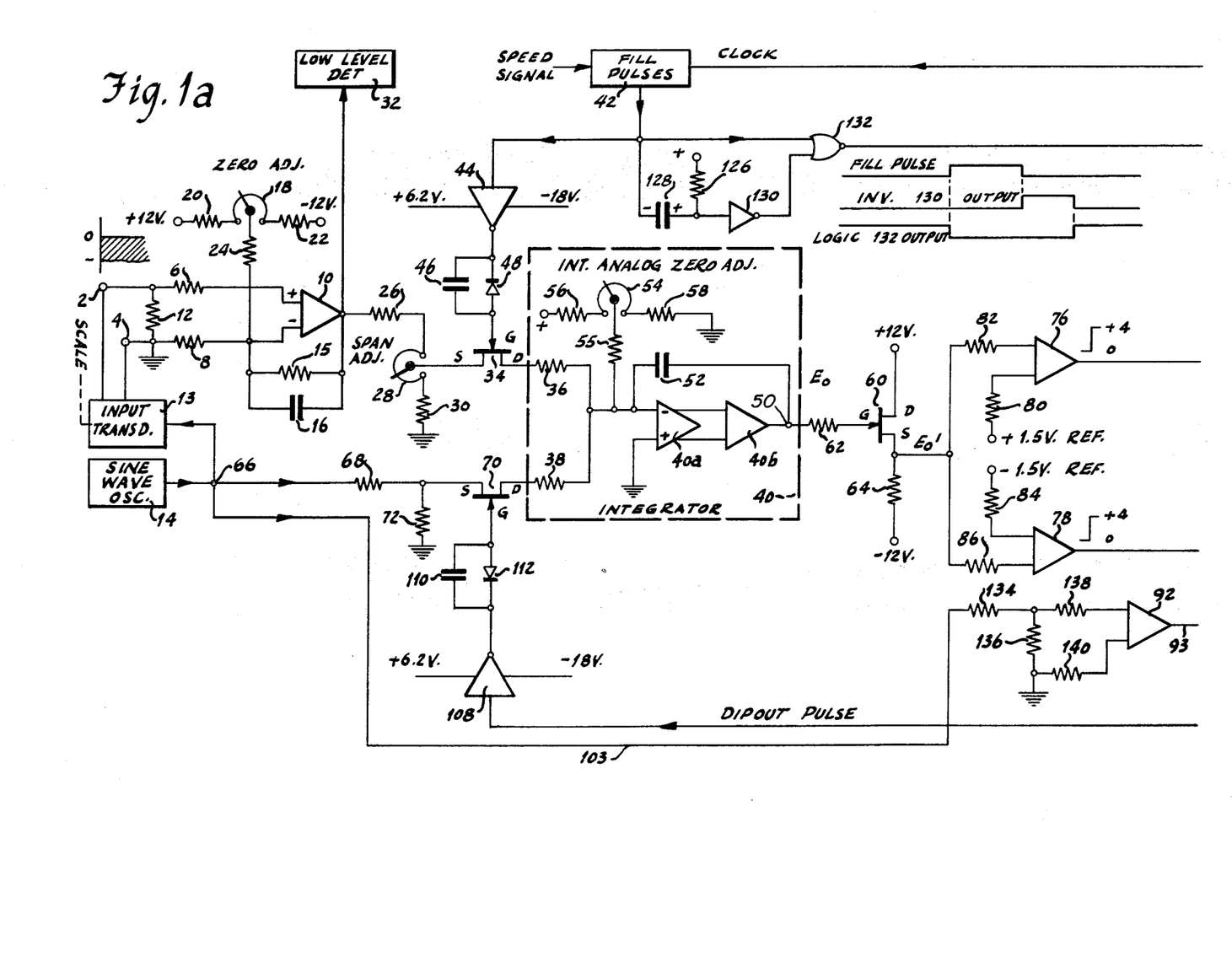
FIGS. 1a and 1b show an electronic integrator system constructed in accordance with the invention.
Figure 1B:
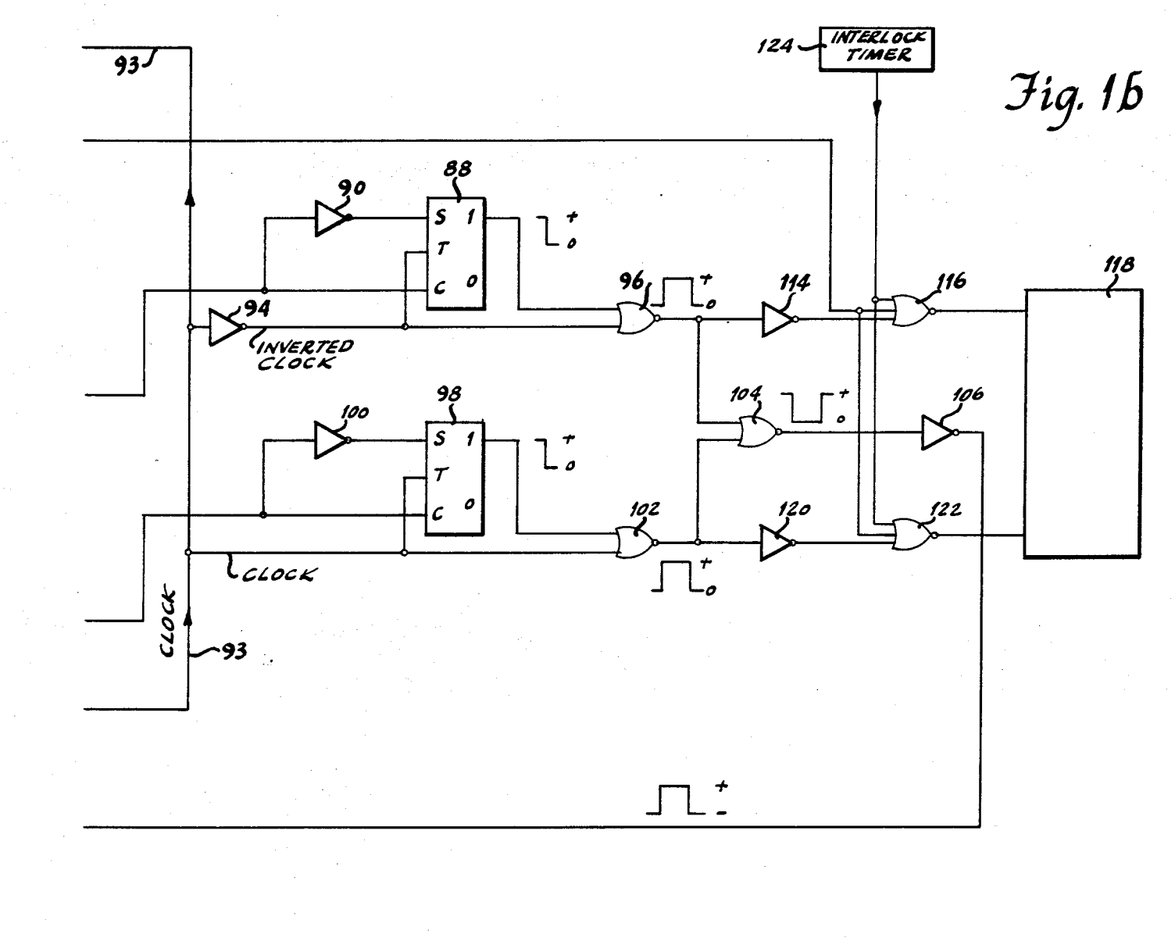

Referring to FIGS. 1a and 1b, there is shown a solid state integrator system that receives two variable information signals such as a variable amplitude flowing weight signals and a variable frequency speed signal, integrates them and provides a digital signal that is a function of the gravimetric flow rate. To perform its function, the integrator also receives a sine wave voltage that may be used for both positive and negative dipout of the integrated voltage and a dipout pulse train that is used to gate either the positive or negative half-cycle of the sine wave for dipout under the control of the polarity and magnitude of the integrated voltage and clock pulses. The clock pulses have been generated by sensing zero voltage crossover points on the sine wave and are in perfect synchronization.

For receiving the variable weight signal, there is provided at the left-hand portion of FIG. 1a a pair of terminals 2 and 4 connected through resistors 6 and 8, respectively, to the input terminals of an input amplifier 10, terminal 4 being grounded. A resistor 12 is connected across weight signal input terminals 2 and 4 and is given a value to satisfy the loading requirements of the circuit or device that supplies the input signal thereto. For a variable weight signal, such device may be an input transducer 13 such as an LVDT (linear variable differential transformer) energized by a sine wave of 1060 Hz. from oscillator 14 and operated by a scale. This input signal is a negative DC voltage as indicated adjacent to these terminals. The positive side of this DC voltage is applied to the lower input terminal 4 that is grounded, and the negative side thereof is applied via resistor 6 to the positive input terminal of amplifier 10.

The amplitude of this negative DC voltage will vary below an average "zero" value when the moving conveyor is loaded. The amplitude of this negative DC voltage may vary above and below this average zero value when the conveyor is run empty.

Amplifier 10 is an operational amplifier connected in a noninverting mode and is provided with a negative feedback resistor 15 connected from its output to the junction between resistor 8 and its negative input terminal. The closed loop gain of the operational amplifier is determined by the ratio of the sum of resistors 15 and 8 to resistor 8. A capacitor 16 is connected across this feedback resistor to integrate and damp out the high-frequency components typically encountered under dynamic weighing conditions.

Amplifier 10 is provided with zero adjustment or calibration means for adjusting the system so that the totalizer output is zero at the end of a test run with an input indicative of empty weight. This means comprises a potentiometer 18 having its resistor connected at one end through a resistor 20 to one side of a DC source such as plus 12 volts, and having the other end of its resistor connected through a resistor 22 to the other side of the DC source such as minus 12 volts. The movable tap of this potentiometer is connected through a resistor 24 to the negative input terminal of amplifier 10.

From this it will be apparent that this zero adjustment means allows adjustment of the input bias voltage to input amplifier 10 to a desired value either above or below zero volts for purposes of zero calibration of the integrator system to an average zero weight value.

The reason for using an operational amplifier in noninverting mode at the integrator input is that the input impedance of the noninverting amplifier is very high. The zero adjustment current has no way of interacting with the LVDT type transducer.

The noninverted output of amplifier 10 is connected to the voltage integrator through a span adjustment or calibration means and signal gating means.

This span adjustment means comprises a circuit from the output terminal of amplifier 10 through a resistor 26, the resistor of a span adjustment potentiometer 28 and a resistor 30 to ground. The movable tap of potentiometer 28 is connected to gating means hereinafter described. This span potentiometer allows adjustment of the output attenuation of amplifier 10 for purposes of span calibration of the system. Span calibration refers to the correct totalization of the weight in a test run with a test weight on the conveyor.

The output of amplifier 10 is also connected to a low-level detector 32. This low level detector may be used to detect an abnormal condition such as when the signal at this point falls below a predetermined value of the order of 20 percent full load signal under conveyor loaded conditions. This low-level detector may be used to operate an alarm or to shut off the integrator output or the like to avoid erroneous output under faulty conditions.

The aforesaid gating means comprises means for gating the weight signal under the control of a speed signal, fill pulses shown in FIG. 2(a), to provide variable amplitude wave form, identified as a gated weight signal shown in FIG. 2b, proportional to the weight of material on successive uniform incremental lengths of the moving conveyor. The speed signal comes from a belt rider measuring wheel operated pulse generator and consists of 100 uniform width pulses per foot of belt travel or any other convenient number of pulses per foot, per meter, or any other unit of length. For example, 10 pulses per foot may be used for an extremely fast-moving belt such as 1,000 feet per minute. One thousand pulses per foot may be used for an unusually slow moving belt such as 5 feet per minute maximum speed. Also, the pulser could be attached to the existing tail pulley whereby it will provide some fractional number of pulses such as 57.832 pulses per foot, or 100 pulses per meter for belts common in Europe. This gating means comprises a field effect transistor 34 of the junction N-channel epitaxial planar type or the like having its source terminal connected to the movable tap of span potentiometer 28, its drain terminal connected to a summing integrator 40 hereinafter described, and its gate terminal connected via a diode 48 and a capacitor 46 to fill pulse driver 44.

This driver circuit which amplifies the fill pulse coming from fill pulse circuit 42 and brings its voltages to the levels necessary to operate the field effect transistor (FET) as an analog gate, is a two-stage transistor circuit or the like whose output is normally at minus 18 volts when it is turned off and goes to plus 6.2 volts when it is turned on by a fill pulse applied to its input. This pulse will be identified as amplified fill pulse. The fill pulse may have a value of plus 3 volts as shown in FIG. 2a and a uniform length controlled by a predetermined number of clock pulses. The output of driver circuit 44 is connected through a coupling capacitor 46 to the gate terminal of field effect transistor 34, there being a unidirectional diode 48 in reverse-parallel connection across capacitor 46. This diode prevents the gate-drain junction from becoming forward biased when the analog signal is negative. When the control signal (amplified fill pulse) rises to positive voltage, the negative charge on the gate terminal of field-effect transistor 34 must be removed if the device is to be turned on. This charge is removed by use of a capacitor across the diode, the diode selected being a low-leakage type to prevent gate current from flowing. A negative voltage on the gate of the FET with respect to its source terminal turns the FET off. Positive voltage on the gate turns the FET on, providing a low impedance path for the analog signal.

Integrator 40 comprises means for integrating the voltage signals applied to its input's. Preamplifier 40a and amplifier 40b interconnected in the manner shown in FIG. 1a together form a high-gain operational amplifier. The positive input of this combined amplifier is grounded. Capacitor 52 is placed in the negative feedback loop and together with resistors 36 and 38 form an "add-subtract" integrator. The output voltage $E_o$ is a complex wave form in respect to time and is a product of two integrated voltage wave forms, one of which is identified as the gated weight signal via resistor 36 in response to which the combined amplifier charges capacitor 52. Every time this complex voltage $E_o$ exceeds plus 1.5 volts or minus 1.5 volts, the positive or negative half of the sine wave voltage is allowed to enter the integrator via resistor 38 to perform a subtract integration. By counting and accumulating these subtract integration commands, the running integrated total is obtained.

For integrator analog zero adjustment, there is provided means for adjusting the input bias voltage thereto. This means comprises a potentiometer 54 supplied from a DC source and having its movable tap connected through a resistor 55 to the integrator input terminal for applying an adjustable positive DC voltage thereto. For this purpose, one end of the resistor of potentiometer 54 is connected through a resistor 56 to a positive voltage source and the other end of such potentiometer resistor is connected through a resistor 58 to ground. This circuit allows an adjustable voltage of the order of 1.5 volts to be applied to 444 megohm resistor 55 and to provide proper biasing current in the order of 33 nanoamps necessary to compensate for all the circuitry leakage and for offset current developed at the input of the operational amplifier.

In order to provide proper isolation for the integrator output, there is provided a field-effect transistor 60 of the N-channel junction type or the the like. Output terminal 50 of the integrator is connected through a resistor 62 of the gate terminal of this field-effect transistor. Its drain terminal is supplied with a positive DC voltage of plus 12 volts and its source terminal is connected through a load resistor 64 to a negative DC voltage of minus 12 volts. The output voltage $E_0'$ is taken from the source terminal in a source follower mode and is proportional in amplitude to and of the same polarity as the integrated voltage $E_0$.

Since the integrator would soon fill up and stop integrating, for continuous operation, it is necessary to dipout voltage therefrom.

As a dipout voltage supply, there is provided a sine wave voltage shown in FIG. 2d applied to terminal 66. This sine wave voltage which may have a frequency of 1060 Hz. or the like comes from the same oscillator 14 that supplies the scale operated LVDT hereinbefore described and is applied across an attenuator comprising resistors 68 and 72 connected in series to ground, the junction between these resistors being connected to the source terminal of field effect transistor 70. Resistors 68 and 72 form a simple attenuator where the sine wave amplitude is attenuated by a factor of six. Also, resistor 72 provides a low impedance path for the source of the FET to ground. The drain terminal of this transistor is connected to the subtract input of the integrator that is connected through resistor 38 to the input of amplifier 40a. Gate control pulses identified as amplified dipout pulses shown in FIG. 2j operate the field effect transistor in the manner hereinbefore described to gate either positive or negative half-cycles of the sine wave, shown in FIG. 2f, depending upon whether the integrating capacitor is charged to a negative or positive voltage, respectively. In other words, the dipout voltage has a polarity whereby it discharges integrating capacitor 52 so that it can continue to be charged by the gated load signal shown in FIG. 2b.

A dipout pulse is produced whenever the integrated voltage exceeds a predetermined amplitude The dipout pulse can be in step with the clock or in step with the inverted clock pulse depending on the value of $E_0$. When $E_0$ is greater than pulse 1.5 volts, the dipout pulse will be in step with the 0 volt portion of inverted clock pulse. When $E_0$ is negative and lower than minus 1.5 volts, the dipout pulse will be in step with the 0 volt portion of clock pulse. The polarity of the dipout half-cycle is such that it will reduce the charge on the integrating capacitor. This $E_0$ sensing is accomplished by a pair of voltage comparators 76 and 78. A bias voltage from a positive 1.5 volt reference voltage source is applied through a resistor 80 to the reference input terminal of comparator 75. The integrated voltage $E_0'$ is connected from the source terminal of integrated output transistor 60 through a resistor 82 to the signal input terminal of comparator 76. As a result, the output of comparator 76 is normally at a low value (0 volts) and will shift to a high value (plus 4 volts) when the input voltage $E_0'$ to this comparator exceeds plus 1.5 volts.

In a similar manner, a bias voltage from a negative 1.5 volt reference voltage source is applied through a resistor 84 to the reference input terminal of comparator 78. An the integrated voltage $E_0'$ is connected from the source terminal of transistor 60 through a resistor 86 to the signal input terminal of comparator 78. As a result, the output of this comparator is normally at a low value (0 volts) and shifts to a high value (plus 4 volts) when input voltage $E_0'$ goes lower than minus 1.5 volts.

A high signal at the output of comparator 76 is used to gate positive half-cycles of the sine wave to discharge the integrator. And a high signal at the output of comparator 78 is used to gate negative half-cycles of the sine wave to charge the integrator as hereinafter described more fully.

For this purpose, there is provided in FIG. 1b means for producing gating pulses under the synchronizing control of inverted clock pulses. This means comprises a connection from the output of comparator 76 to clear input terminal o C of J-K flip-flop circuit 88 and to the input terminal of a signal inverter 90 whose output terminal is connected to set terminal S of J-K flip-flop circuit 88. The output terminal of a clock pulse source 92 is connected through a conductor 93 and a signal inverter 94 to trigger input terminal T of the J-K flip-flop and to one input terminal of an integrated logic circuit 96. The "1" or Q output of the J-K flip-flop circuit is connected to the other input terminal of integrated logic circuit 96. The specific manner in which this part of the system functions to produce a gating (dipout) pulse in time with the inverted clock pulse will hereinafter be described.

Also for such gating purposes, the aforementioned means comprises a connection from the output of comparator 78 to clear input terminal C of another J-K flip-flop circuit 98 and through a signal inverter 100 to set terminal S of this J-K flip-flop. The output terminal of clock pulse source 92 is connected through conductor 93 directly to trigger input terminal T of this J-K flip-flop and to one input terminal of an integrated logic circuit 102. The "1" or Q output terminal of this J-K flip-flop is connected to the other input terminal of integrated logic circuit 102.

The clock pulses coming from source 92 are formed under the control of the sine wave voltage coming thereto from oscillator 14 through conductor 103 and are precisely synchronized with the sine wave at its zero crossover points with respect to ground as shown in FIG. 2d and 2h. This is accomplished by using a comparator 92. Resistors 134 and 136 form a simple attenuator where the sine wave amplitude is attenuated down to the level acceptable to the given type of integrated circuit comparator. The noninverting input of the comparator is connected via resistor 138 to the junction of the attenuator. The inversion input is connected via resistor 140 to ground. Every time the sine wave shown in FIG. 2d goes through its zero crossover point with respect to ground to a positive voltage direction, the comparator switches on from zero volts to pulse 4 volts as shown in FIG. 2h and stays on until the sine wave reaches the other zero crossover point in respect to ground where the sine wave voltage goes in the negative direction switching the comparator off. By this method, a precise clock synchronization with the sine wave is accomplished. That is the negative-going trailing edge of each clock pulse coincides with the negative-going zero crossover point of each sine wave cycle. These clock pulses go to trigger input terminal T of J-K flip-flop 98 and to activate one input of logic circuit 102. These clock pulses are also connected through conductor 93 to fill pulse source 42.

The inverted clock pulses coming from inverter 94 are also precisely synchronized with the sine wave at its zero crossover points with respect to ground as shown in FIG. 2d and 2e. That is, the negative-going trailing edge of each inverted clock pulse coincides with the positive-going zero crossover point of each sine wave cycle.

Therefore, if the negative-going transitions of the clock pulses and inverted clock pulses are used for gating, it will be apparent that the inverted clock pulses will gate positive half-cycles and the clock pulses will gate negative half-cycles of the sine wave.

The outputs of logics 96 and 102, NOR gates, are connected to the two inputs of integrated logic circuit 104, whose output is connected through a signal inverter 106 back to the input of a driver circuit 108. This driver circuit 108 is like driver circuit 44 hereinbefore described and is used to gate field effect transistor 70. For this purpose, the output of driver circuit 108 is connected through a coupling capacitor 110 to the gate terminal of transistor 70, there being a unidirectional diode in reverse-parallel connection with capacitor 110 for purposes hereinbefore described.

OPERATION

When a weight signal in the form of a negative DC voltage that varies in amplitude is applied to input terminals 2 and 4, it goes through resistor 6 to input amplifier 10, terminal 4 being grounded. This signal is amplified with a gain of about 4 in the noninverting amplifier. The resultant negative voltage passes through resistor 26, span adjust potentiometer 28 and resistor 30 to ground. At the movable tap of the span adjust potentiometer, the negative load signal is attenuated to the desired level to meet calibration requirements.

Let it be assumed that no fill pulses are present. Then the output voltage coming from fill pulse driver 44 will be − 18 volts. The field effect transistor 34 will be switched off, effectively blocking the load signal and preventing it from entering into the summing integrator via resistor 36.

Now when fill pulses shown in FIG. 2a come from source 42, they will cause the output of driver 44 to shift from −18 volts, to plus 6.2 volts that is applied through coupling capacitor 46 to the gate of transistor 34. The transistor turns on, allowing voltage representing load signal to pass through the transistor for the duration of each fill pulse to provide the gated weight signal shown in FIG. 2b. This gated weight signal voltage wave form has a uniform length determined by the width of the fill pulse.

The fill pulse is activated by the speed pulse, waits for a first clock pulse, gets in step with it, and allows a preset number of clock pulses to enter an electronic (preset type) counter where a predetermined number of clock pulses are allowed to accumulate. During this period while counting is performed in circuit 42, the fill pulse is generated. This fill pulse generator acts, in effect, as an electronic gear box for a pulse tachometer where the same pulse tach is used for spanning the integrator over large rated belt speed ranges. The fill pulse can be only one clock pulse wide or up to 56 clock pulses wide. This span requirement depends on a maximum belt speed rating. The lower the maximum operating speed that is going to be specified, the wider the fill pulse must be set. Normally, the duty period of the fill pulse is typically going to be set between 50 percent and 70 percent of the period between speed pulses.

The integrated voltage becomes the output voltage $E_0$ of the integrator.

The integrator output voltage is applied from output terminal 50 through resistor 62 to the gate of field effect transistor 60 to control the source terminal voltage $E_0'$ thereof in proportion to the integrated voltage. This voltage is applied through resistors 82 and 86 to voltage comparators 76 and 78, respectively. Comparator 76 responds to positive voltage exceeding plus 1.5 volts and comparator 78 responds to negative voltage below minus 1.5 volts. Normally the output of comparator 76 is at zero volts (low) when its input is at or below plus 1.5 volts, but when it receives an input voltage exceeding plus 1.5 volts, its output shifts to plus 4 volts (high). In a similar manner, the output of comparator 78 is normally at zero volts (low) when its input is at or more positive than minus 1.5 volts but shifts to plus 4 volts (high) when its input goes more negative than minus 1.5 volts.

The J-K flip-flop 88 operates as follows. With set S in the high state and clear C in the low state, a first negative-going pulse on trigger T causes the output to go to high state. It will remain at high state as long as set S will remain at high state and clear C at low state. This is the condition when the integrated voltage $E_0'$ to comparator 76 is below plus 1.5 volts. With set S in the low state and clear C in the high state, a first negative-going pulse on trigger T causes the output to go to low state. It will remain at low state as long as set S will remain at low state and clear C at high state. This is the condition when the integrated voltage $E_0'$ to comparator 76 exceeds plus 1.5 volts.

J-K flip-flop 98 operates in a similar manner with respect to the integrated voltage $E_0'$ to comparator 78 being less negative or more negative than minus 1.5 volts, respectively.

The clock pulses are coming from source 92 to signal inverter 94 and inverted clock pulses are applied from inverter 94 to trigger T of the J-K flip-flop. Let it be assumed now that the integrated voltage $E_0'$ to comparator 76 rises above plus 1.5 volts, causing the output of this comparator to shift from low to high state. This high state is applied directly to clear C of J-K flip-flop 88. This high state is inverted in signal inverter 90 to apply a low state to set S of the flip-flop. Nothing will happen until the first negative-going transition of an inverted clock pulse shown in FIG. 2e causes the output of flip-flop 88 to go to a low state. This low state is applied to one input of logic 96, allowing inverted clock pulses to ripple through and as long as the output of the flip-flop remains low, inverted clock pulses will be allowed to go through.

For this purpose, the other input of logic 96 is placed at a low state by the same inverted clock pulse that was applied to trigger T. Logic 96 now has low states on both of its inputs to cause its output to shift from low to high state. This logic 96 and the other logics hereinafter described are preferably integrated logic circuits of the RTL (resistor-transistor logic) type. This logic has a high output only when both inputs are low. If one or both inputs are high, its output is low. This high output (shift from low to high) of logic 96 is applied to one input of logic 104.

The other input of logic 104 is in a low state. This is because the output of comparator 78 is at a low state, causing set S to be in the high state and clear C to be in the low state whereby the output of flip-flop 98 was previously set by the clock pulse in the high state. This high state at one input of logic 102 prevents clock pulses from rippling through and maintains its output in a low state.

Therefore, with one input of logic 104 in a low state and the other input thereof shifting from low to high as aforesaid, its output shifts from high to low for the duration of the inverted clock pulse. This output of logic 104 is inverted in signal inverter logic 106 to provide a gating pulse shown in FIG. 2g that is applied back to driver 108. Therefore, these just generated dipout pulses are generated in step with inverted clock pulses. Inverted clock pulses will be allowed to ripple through as long as voltage $E_0'$ is above plus 1.5 volts.

This gating pulse operates the driver circuit to cause its output to shift from minus 18 volts to plus 6.2 volts for the duration of the gating pulse. This output of driver 108 is applied through coupling capacitor 110 to the gate of field-effect transistor 70 to turn it on for the duration of the gating pulse.

It will be seen from FIGS. 2d and 2g that this gating (dipout) pulse coincides with a positive half-cycle of the sine wave. Consequently, field-effect transistor 70 is gated on to pass the positive half-cycle of the sine wave shown in FIG. 2f as a dipout pulse to discharge the integrating capacitor.

The curve in FIG. 2c shows the effect of both the integration and the dipout. Dipout may also be accomplished by the integration. As each gated load signal (assuming scale is loaded) in FIG. 2b enters into the integrator, the integrator performs integration. $E_0'$ increases. After the integrator output voltage $E_0'$ exceeds plus 1.5 volts, the first dynamic zero (negative-going transition) of the inverted clock causes a dipout pulse to be generated. This dipout pulse operates the field-effect transistor in the manner hereinbefore described and the sine wave half-cycle will enter this integrator, discharging the integrating capacitor and reducing the voltage $E_0'$ as shown at the left-hand side in FIG. 2c. The integrator voltage then rises again to exceed the threshold voltage of the comparator and another dipout pulse again is a cause of discharge. During the periods between fill pulses, no load signal is presented to the integrator and output voltage $E_0'$ will stay level unless the integrator analog zero adjustment is out of balance.

Figure 2:
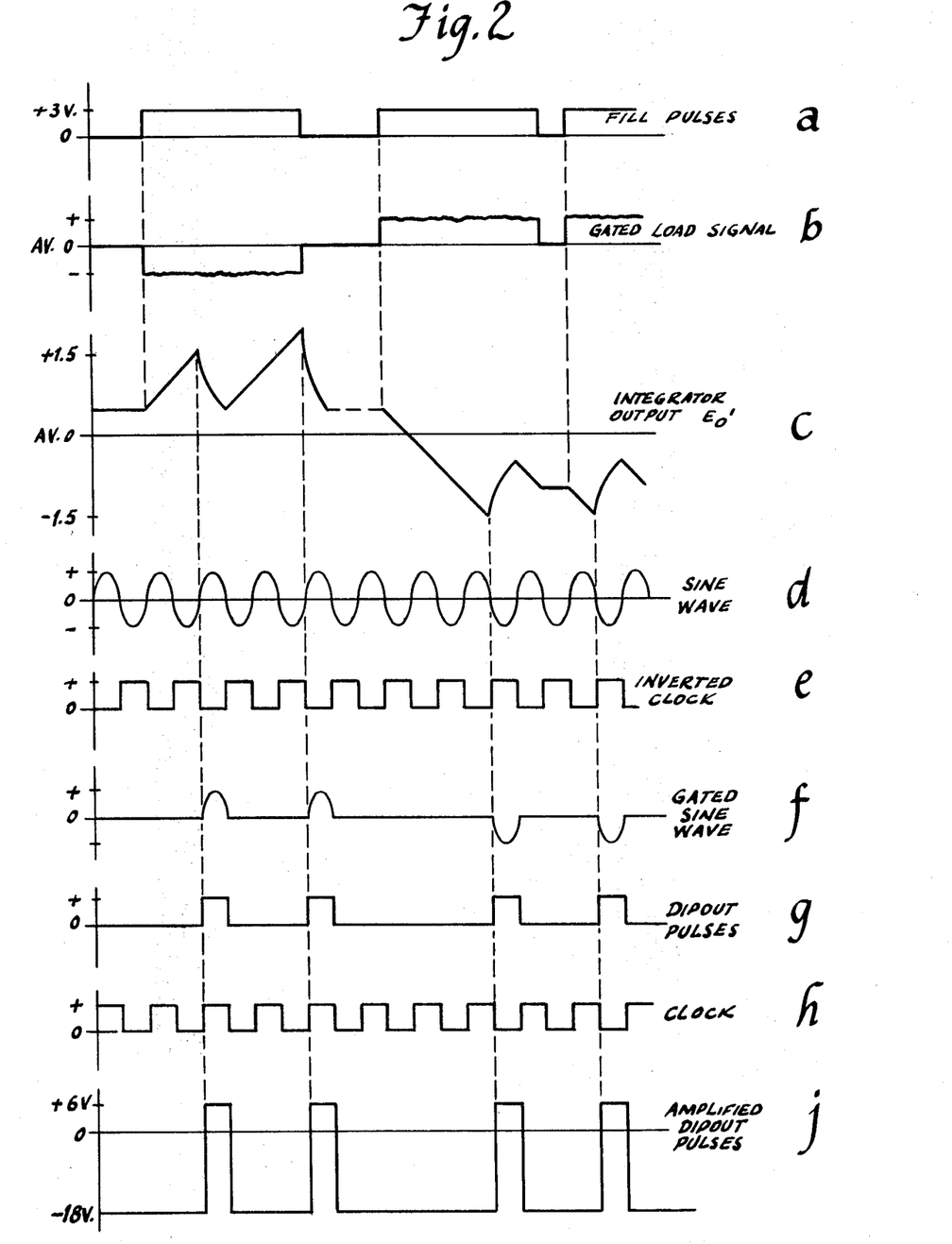
FIGS. 2a–j are graphical illustrations of operation characteristics of the system of FIGS. 1a and 1b.

The right-hand portion of the curve in FIG. 2c shows how the integration is performed below average zero weight. This time the positive voltage representing weight signals enters the integrator as hereinbefore described. Under this condition, the integrator charges capacitor 52 to the negative polarity. This causes the integrator output voltage $E_0'$ to decrease as shown at the right-hand side in FIG. 2c. If sufficient negative load indicative, positive gated voltage in FIG. 2b, is received by the integrator so that voltage $E_0'$ goes more negative than minus 1.5 volts, the output of comparator 78 will shift from low to high state, a dipout pulse will be generated and will allow a negative half-cycle to enter the integrator, charging up the capacitor and $E_0'$ will go up. For this purpose, the high state from comparator 78 will be applied to clear C of J-K flip-flop 98. This high state will also be inverted in logic 100 to a low state and applied to set S of the flip-flop. The negative-going transition of the next clock pulse, FIG. 2 h, will be applied to trigger T of flip-flop 98 and to operate one input of logic 102. This pulse at trigger T will cause the output of the flip-flop to shift from high to low state. Two low inputs on logic 102 cause its output to shift from low to high state and this is applied to one input of logic 104. Since the other input of logic 104 is at a low state, the output thereof shifts from high to low state for the duration of the clock pulse. This pulse is inverted in logic 106 to provide a gating pulse as shown at the right-hand side in FIG. 2g to operate driver 108. As a result, driver 108 gates field effect transistor 70 to pass a negative half-cycle of the sine wave to the integrator as shown in FIG. 2f. This negative half-cycle will charge the integrator capacitor to bring the output voltage $E_0'$ above minus 1.5 volts. If the integrator output voltage again goes more negative than minus 1.5 volts, another dipout half-cycle will be applied as shown at the extreme right-hand portion of the curves in FIG. 2f.

In view of the formation of gated positive or negative half-cycles whenever the integrator output voltage goes above 1.5 volts or below minus 1.5 volts, the integrator can operate continuously and will not exceed its integrating capacity. The dipout pulses that gate the sine wave may then be put into a totalizer to provide a running indication of the total of the variable such as weight that is being integrated.

Since there are positive weight indicative pulses coming from logic 96 and there may at times be negative weight indicative pulses coming from logic 102, a forward-backward counter may be used for totalizing. For this purpose, the output of logic 96 (two-legged NOR gate) is also applied through a signal inverter 114 to one of the three inputs of a logic 116 (three-legged NOR gate) whose output is connected to the forward-count input of a counter 118. The output of logic 102 (two-legged NOR gate) is also applied through a signal inverter 120 to one of the three inputs of a logic 122 (three-legged NOR gate) whose output is connected to the backward-count input of counter 118. While logics 116 and 122 are shown directly connected to the respective count up and count down inputs of the counter, it will be appreciated that other gating or control circuits may be connected therebetween.

The purpose of logics 116 and 122 is to admit count pulses to the counter only under certain conditions. For this purpose, these logics are used like NOR gate logics whereby two gating inputs must both be in a low state in order to allow count pulses to pass therethrough to the counter.

One of these conditions is an interlock timer condition For this purpose, the output of an interlock timer 124 or the like is connected to one input of each logic 116 and 122. This interlock timer applies a low state to these inputs when the integrator system is being operated so as not to prevent the passage of count pulses therethrough. When the conveyor system is turned off, the interlock timer will start timing a predetermined adjustable time interval and will shift its output from low to high state at the end of such interval to prevent further count pulses from passing through logics 116 and 122. For example, the timer interval of this interlock timer may be set at the time it takes for the conveyor to coast to a stop to allow all the material weight to be totalized but to prevent spurious pulses (that may get generated thereafter by the pulse tach in response to various types of vibration in case it was stopped at a critical point) from passing through. While an interlock timer has been shown for exemplary purposes, it will be apparent that other gating control means may be used therefor.

The other of these conditions is a delay generator condition. This delay generator is used to allow transmission of count pulses during and for a time interval after each fill pulse and to prevent the transmission to the counter of any pulses that may be generated due to integrating capacitor 52 drift or the like causes. At times, it might be desirable to operate the conveyor or other input signal means at a small fraction of its rated speed whereby the fill pulses will occur rather infrequently. Initially, the integrator analog zero adjustment at potentiometer 54 will take care of any unwanted variation occurring between fill pulses. But after a few years of use and component aging, it may not do its job quite as precisely, requiring adjustment. Then the digital method by use of a delay generator will be of some help in solving such drift problems.

For this purpose, this delay generator comprises an RC timing circuit comprising a resistor 126 and a capacitor 128, an inverter logic 130 and a two-input logic NOR gate 132. The output of fill pulse source 42 is connected through capacitor 128 to the input of inverter logic 130. A positive DC voltage source is connected through resistor 126 to the input of inverter logic 130. The output of this inverter logic 130 is connected to one input of logic 132. The other input of logic 132 is connected to the source of fill pulses.

As shown by the pulses adjacent to this delay generator, normally positive voltage is applied through resistor 126 to inverter 130 so that the output of the inverter is at a low state. This low state is applied to one input of logic 132. When no fill pulses are present, the other input of logic 132 is also at a low state and capacitor 128 is charged to the polarity shown. These low states at both inputs keep the output of logic 132 at a high state. This high state is applied to both logics 116 and 122 to prevent passage of any count pulses therethrough.

Now when a fill pulse (high) comes from source 42, it is applied to one input of logic 132 to shift its output to low state. This low state activates logics 116 and 122 to allow any count pulses to pass to the counter. The fill pulse is also applied to capacitor 128 to discharge it. When the fill pulse terminates, the upper input of logic 132 shifts back to low state but its output is maintained at low state by the lower input. For this purpose, the termination of the fill pulse shifts the left-hand side of capacitor 128 from plus voltage to zero, causing the input of inverter 130 to go to low state and its output to go to a high state. This high state at the lower input maintains the output of logic 132 at a low state. Capacitor 128 now charges through resistor 126 and after an interval determined by the RC time constant, the input to inverter 130 goes high enough that its output goes to a low state. This causes the output of logic 132 to shift back to high state and inhibit any further passage of pulses through logics 116 and 122.

From the foregoing, it will be apparent that the delay generator allows count pulses to pass to the totalizer during each fill pulse and for a timed period thereafter. At any other time, any spurious count pulses that may occur are prevented from passing to the totalizer.

The solid-state integrator system hereinbefore described has the additional advantage in that effective "bridging action" (self-compensation) is accomplished in respect to both frequency and amplitude variations.

For example, let it be assumed that the amplitude of the sine wave has increased by 2 percent but its frequency remains the same. It will be recalled that this sine wave supplies both the scale operated LVDT (input transducer 13) that forms the input signal at terminals 2 and 4, and the dipout supply voltage at terminal 66. In addition, this sine wave controls the generation of the clock pulses in synchronism with the zero crossover points of such sine wave as hereinbefore described, and the clock pulses control the length of the fill pulses.

Under these conditions, the 2 percent increase in the sine wave amplitude will cause the input signal at terminals 2 to 4 to increase by the same percentage. But the dipout half-cycle amplitude will also increase by 2 percent. Consequently, the end result will be that no error will leave the integrator output.

For another example, let it be assumed that the frequency of the oscillator that produces the sine wave decreases by 2 percent but its amplitude remains the same.

This will cause the clock pulse frequency to decrease by 2 percent, increasing its pulse width by 2 percent.

Such decrease in sine wave frequency will cause the area under the dipout half-cycle to increase by 2 percent.

The input signal at terminals 2 and 4 will remain substantially unchanged since it is possible to select an LVDT that is substantially insensitive to frequency variations around 1060 Hz. Consequently, there will be only a 2 percent increase in the area of the input signal gated by the fill pulse or, in other words, the gated load signal shown in FIG. 2(b) will increase in area by 2 percent due to corresponding increase in the fill pulse width controlled by the clock pulses.

The result of all this is a 2 percent increase in both the gated information voltage and gated dipout voltage waveform pulse areas, introducing no error into the integrator output.

While the system hereinbefore described is effectively adapted to fulfill the objectives stated, it is to be understood that the invention is not intended to be confined to the particular preferred embodiment of electronic integrator system disclosed, inasmuch as it it susceptible of various modifications without unduly departing from the scope of the appended claims.

I claim:

1. In an electronic integrator system, the combination comprising:

means for providing an analog electrical signal that varies in amplitude as a function of a first external condition;

means for providing an intermittent electrical signal comprising a train of uniform length fill pulses that varies in frequency as a function of a second external condition;

first gating means operably be said fill pulses for gating said analog signal to provide a train of uniform length variable amplitude information voltages;

an integrator circuit for receiving said information voltages to provide an output voltage proportional in amplitude to the integral thereof;

level detector means responsive to said integrated output voltage when it exceeds a predetermined value for providing a control signal;

a source of sine wave voltage;

a clock pulse circuit controlled by said sine wave voltage for providing a train of clock pulses synchronized with the cycles of said sine wave;

digital means controlled by said control signal and said clock pulses and being operable by each clock pulse during receipt of said control signal for forming a dipout control pulse for gating a half-cycle of said sine wave as a dipout voltage, said gated half-cycle being of the proper polarity relative to the polarity of said information pulses under the control of said clock pulse thereby changing the integrated voltage back by a uniform decremental amount;

and means operable by said digital means upon formation of said dipout pulse for providing a count pulse that is adapted to be applied to a totalizer.

2. The invention defined in claim 1, wherein said means for providing an analog electrical signal comprises:

a transducer powered by said sine wave voltage and adapted to be controlled by the first external condition thereby to provide said analog electrical signal;

and the use of the same sine wave voltage for both said transducer and said dipout voltage provides effective compensation in the event of sine wave amplitude variation in that any increase in the sine wave amplitude will increase the information voltage going into the integrator circuit but will also proportionally increase the dipout voltage and vice versa to prevent introduction of any error in the integrator output.

3. The invention defined in claim 1, wherein said means for providing an intermittent electrical signal comprising a train of uniform length fill pulses that vary in frequency as a function of a second external condition comprises:

means for providing a condition indicative pulse signal having a frequency proportional to said second external condition;

means controlled by said clock pulses to provide for each said condition indicative pulse a uniform length fill pulse having a length equal to a predetermined number of clock pulses;

and the use of the sine wave voltage for both said dipout voltage and said clock pulses that determine the length of the gating period for said analog electrical signal provides effective compensation in the event of the sine wave frequency decrease in that any decrease in such frequency will proportionally increase the fill pulse width and the information voltage area but will also proportionally increase the area under the dipout half-cycle and vice versa to prevent introduction of any error in the integrator output.

4. The invention defined in claim 1, wherein said means for providing an analog electrical signal comprises:

an amplifier;

a transducer adapted to be controlled by the first external condition to provide a voltage to the input of said amplifier;

means for applying an adjustable bias voltage to the input of said amplifier for zero calibration of the integrator system;

and adjustable attenuator means coupling the output of said amplifier to said first gating means for correct totalizing calibration of the integrating system and being noninteracting with said zero calibration means.

5. The invention defined in claim 1, wherein said means operable by said digital means upon formation of said dipout control pulse for providing a count pulse that is adapted to be applied to a totalizer comprises:

third gating means effective when activated for passing said count pulse;

and means for activating said third gating means under predetermined conditions.

6. The invention defined in claim 5, wherein said means for activating said third gating means under predetermined conditions comprises:

pulse delay generator means operated by each fill pulse for activating said third gating means for the duration of said fill pulse and for a predetermined additional time interval whereafter said third gating means blocks the passage of any spurious pulses that might occur.

7. The invention defined in claim 5, wherein said means for activating said third gating means under predetermined conditions comprises:

an interlock timer operable to activate said third gating means when the integrator is operating and for a predetermined time interval after the system is turned off.

8. The invention defined in claim 1, wherein said integrator circuit comprises:

a field-effect transistor circuit connected in the source follower mode to provide desired isolation for the integrator so that no voltage is lost or gained by the integrator when said level detector means operate and including means for applying the integrated voltage at its gate and for applying from its source terminal an output voltage to said level detector means.

9. The invention defined in claim 1, wherein said integrator circuit comprises:

means for integrating information voltages of either or both polarities and for providing either a positive output voltage or a negative output voltage in accordance therewith.

10. The invention defined in claim 9, wherein said level detector means comprises:

a positive level detector responsive to said integrated output voltage exceeding a predetermined positive value for providing said control signal;

and a negative level detector responsive to said integrated output voltage falling below a predetermined negative value for providing another like control signal.

11. The invention defined in claim 10, wherein said digital means comprises:

means for inverting said clock pulses to provide both clock pulses and inverted clock pulses, the clock pulses being in synchronism with the positive half-cycles of said sine wave voltage and the inverted clock pulses being in synchronism with the negative half-cycles of said sine wave voltage;

first logic means operated by the first control signal and the inverted clock pulses for providing dipout control pulses for gating the positive half-cycles of the sine wave voltage as dipout voltages;

and second logic means operated by the other control signal and the clock pulses for providing dipout control pulses for gating the negative half-cycles of the sine wave voltage as dipout voltages.

12. In an electronic integrator system, the combination comprising:

means for providing an analog electrical signal that varies in amplitude as a function of a first external condition;

means for providing an intermittent electrical signal comprising a train of uniform length fill pulses that vary in frequency as a function of a second electrical condition;

first gating means operable by said fill pulses for gating said analog signal to provide a train of uniform length variable amplitude information voltages;

an integrator circuit for receiving said information voltages to provide an output voltage proportional in amplitude to the integral thereof;

level detector means responsive to said integrated output voltage when it exceeds a predetermined value for providing a control signal;

a source of sine wave voltage;

a clock pulse generator circuit controlled by said sine wave voltage for providing a train of clock pulses and inverted clock pulses synchronized with the positive and negative half-cycles of said sine wave voltage;

digital means controlled by said control signal and said clock and inverted clock pulses and being operable by a clock or inverted clock pulse during receipt of said control signal for forming a dipout pulse;

second gating means responsive to said dipout pulse for gating a half-cycle of said sine wave voltage as a dipout voltage, said gated half-cycle being of the proper polarity relative to the polarity of said information voltage under the control of said dipout pulse thereby reducing or increasing the integrated voltage by a uniform amount;

and means operable by said digital means upon formation of said dipout pulses in step with clock pulses or inverted clock pulses for providing count pulses that are adaptable to applied to an add-subtract counter.

13. The invention defined in claim 12, wherein said means operable by said digital means upon formation of said dipout pulse in step with clock pulses or inverted clock pulses for providing count pulses that are adaptable to be applied to an add-subtract totalizer comprises:

third gating means effective when activated for passing add or subtract pulses;

and means for activating said third gating means under a predetermined condition.

14. In an electronic integrator system, the combination comprising:

means for providing an analog electrical signal that varies in amplitude as a function of a first external condition such as weight;

means for providing an intermittent electrical signal comprising a train of rate pulses that varies in frequency as a function of a second external condition such as speed;

a source of AC voltage;

a clock pulse circuit controlled by said AC voltage for providing a train of clock pulses in step with the cycles of said AC voltage;

means controlled jointly by said rate pulses and said clock pulses for providing a train of uniform length fill pulses having a frequency proportional to the second external condition;

first gating means operable by said fill pulses for gating said analog signal to provide a train of uniform length variable amplitude information voltages;

an integrator circuit for receiving said information voltages to provide an output voltage proportional in amplitude to the integral thereof;

level detector means responsive to said integrated output voltage when it exceeds a predetermined value for providing a control signal;

static switching means operable by a clock pulse when said control signal is present for forming a dipout control pulse;

second gating means responsive to said dipout control pulse for gating a half-cycle of said AC voltage as a dipout voltage, said gated half-cycle being of the proper polarity relative to the polarity of said information voltage under the control of said dipout pulse thereby changing the integrated voltage back by a uniform amount;

and means operable by said static switching means when it forms said dipout control pulse for providing a count signal that is adapted to operate a totalizer.